United States Patent [19]

Lindberg

[11] Patent Number: 5,300,191
[45] Date of Patent: Apr. 5, 1994

[54] CHLORINE DIOXIDE GENERATION FOR A ZERO DISCHARGE PULP MILL

[75] Inventor: Hans G. Lindberg, Glens Falls, N.Y.

[73] Assignee: Kamyr, Inc., Glens Falls, N.Y.

[21] Appl. No.: 997,306

[22] Filed: Dec. 23, 1992

Related U.S. Application Data

[63] Continuation-in-part of Ser. No. 922,334, Jul. 30, 1992.

[51] Int. Cl.$^5$ .................................... D21C 11/12
[52] U.S. Cl. ........................... 162/31; 162/29; 162/30.1; 162/DIG. 8; 423/475; 423/478; 423/DIG. 8
[58] Field of Search ............... 423/477, 478, 475, 29; 162/30.1, 31, DIG. 8; 204/95

[56] References Cited

U.S. PATENT DOCUMENTS

| | | | |
|---|---|---|---|
| 4,405,418 | 9/1983 | Takemura | 204/232 |
| 4,678,655 | 7/1987 | Twardowski | 423/478 |
| 5,116,595 | 5/1992 | Scribner et al. | 423/477 |
| 5,145,660 | 9/1992 | Wickstrom | 423/478 |

FOREIGN PATENT DOCUMENTS 2041536  11/1991  Canada.

OTHER PUBLICATIONS

Bertel Myréen, "Closing Up the Bleach Plant", Jun. 1991, pp. 1–4.
W. H. Rapson & D. W. Reeve, "The Effluent-Free Bleached Kraft Pulp Mill", TAPPI vol. 56, No. 9, Sep. 1973, pp. 112–115.

*Primary Examiner*—Steve Alvo
*Assistant Examiner*—Dean T. Nguyen
*Attorney, Agent, or Firm*—Nixon & Vanderhye

[57] ABSTRACT

Chloride dioxide for a cellulose pulp mill bleach plant is produced by concentrating (evaporating) liquid effluents from the bleach plant to a concentration level high enough for incineration, incinerating the concentrated effluents to produce an ash, chemically reacting at least a part of the ash to produce chlorate, and using the chlorate in the manufacture of chlorine dioxide. The ash is purified to produce sodium chloride and the sodium chloride is reacted with oxygen and external energy to produce sodium chlorate. The chlorate is then used in the manufacture of chlorine dioxide. Sulfates produced are used to manufacture acid and/or caustic, and heavy metal hydroxides are disposed of. A part of the ash may be used directly in chlorine dioxide manufacture. At least some of the salt from chlorate manufacture may be fed to the chemical recovery loop, including a recovery boiler, in the pulp mill. Evaporated gases may be returned to the pulp mill and bleach plant.

22 Claims, 1 Drawing Sheet

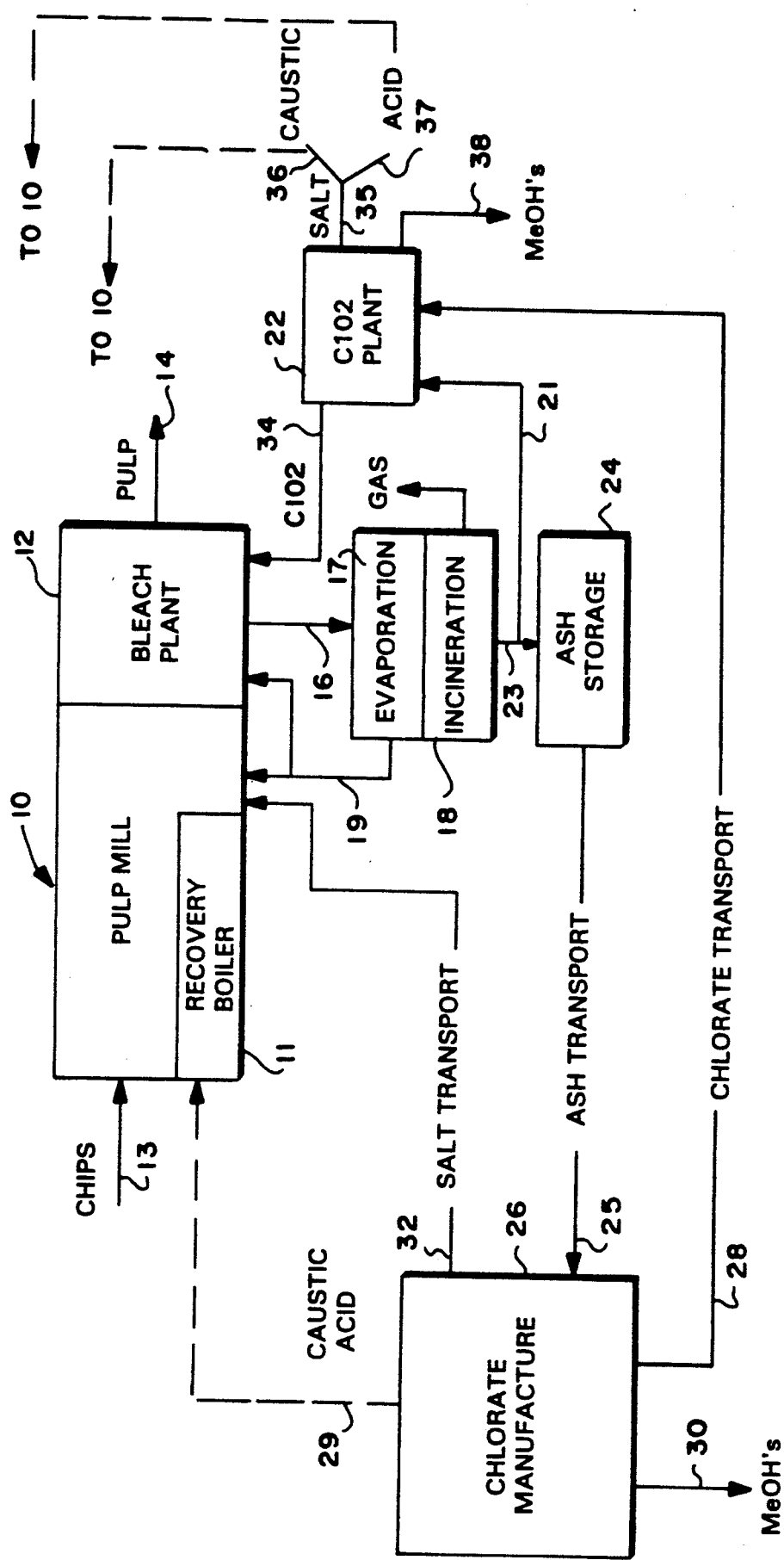

CHLORINE DIOXIDE GENERATION FOR A ZERO DISCHARGE PULP MILL

CROSS-REFERENCE TO RELATED APPLICATION

This application is a continuation-in-part of application Ser. No. 07/922,334 filed Jul. 30, 1992 (Pending) (the disclosure of which is hereby incorporated by reference herein).

BACKGROUND AND SUMMARY OF THE INVENTION

One component of a zero discharge pulp mill, such as described in the parent application, is a system for the manufacture of chlorine dioxide for use in the bleach plant of the pulp mill. It is highly desirable to be able to generate all of the chlorine dioxide on site, and in a manner recovering chemicals from the pulp production.

In the parent application, chlorine dioxide generation is accomplished by concentrating the bleach plant effluent, incinerating it, and then subjecting it to a leaching stage in which the sodium salts are leached prior to crystal washing. Sodium chloride, which is removed during crystal washing, is directed to chlorine dioxide production while part of the leachate is directed back to the recovery boiler of a chemical recovery loop of the pulp mill.

According to the present invention, another method of producing chlorine dioxide, suitable for use in the zero discharge pulp mill of the parent application, is provided, which avoids the leaching and crystal washing stages. In the various aspects of the present invention, after concentration and incineration of bleach plant effluents, the ash produced may be fed directly to chlorine dioxide production, or after storage to chlorate manufacture, or a part to each. In a chlorate manufacture stage the ash is chemically reacted to produce chlorate which is then subsequently used in chlorine dioxide manufacture.

According to one aspect of the present invention a method of producing chlorine dioxide for a cellulose pulp mill having a bleach plant, is provided. The method comprises the steps of automatically, continuously and sequentially: (a) Concentrating liquid effluents from the bleach plant to a concentration level high enough for incineration. (b) Incinerating the concentrated bleach plant effluents to produce an ash. (c) Chemically reacting at least a part of the ash from step (b) to produce chlorate. And, (d) using the chlorate produced in step (c) in the manufacture of chlorine dioxide, which chlorine dioxide is used in the bleach plant to bleach pulp. Step (c) is practiced by purifying the ash to produce sodium chloride, and reacting sodium chloride from the ash with oxygen and external energy to produce sodium chlorate. This also produces sulfates and heavy metal hydroxides. The sulfates are used to produce acid and caustic, which are used elsewhere in the mill. Part of the ash from step (b) can be used directly in chlorine dioxide manufacture. In the chlorine dioxide manufacture caustic and acid also can be produced, as are metal hydroxides (which are disposed of).

According to another aspect of the present invention, a method of producing chlorine dioxide for a cellulose pulp mill having a bleach plant is provided. The method comprises the steps of automatically, continuously and sequentially: (a) Concentrating liquid effluents from the bleach plant to a concentration level high enough for incineration. (b) Incinerating the concentrated bleach plant effluents to produce an ash. And, (c) using at least a part of the ash directly in the manufacture of chlorine dioxide, which chlorine dioxide in turn is used in the bleach plant to bleach pulp.

According to another aspect of the present invention, a method of minimizing effluents from a cellulose pulp mill having a bleach plant and a recovery boiler and chemical recovery loop, is provided. The method comprises the steps of continuously: (a) Concentrating liquid effluents from the bleach plant to a concentration level high enough for incineration. (b) Incinerating the concentrated bleach plant effluents to produce an ash containing sodium carbonate, sodium sulfate, and sodium chloride. (c) Chemically reacting at least a part of the ash to produce chlorate and sodium salts. (d) Feeding at least a substantial portion of the sodium salts to the chemical recovery loop of the recovery boiler. And, (e) using the chlorate produced in step (c) in the manufacture of chlorine dioxide, which is used in the bleach plant.

It is the primary object of the present invention to provide a method for the effective production of chlorine dioxide, preferably all the chlorine dioxide needs for a bleach plant of a pulp mill, from bleach plant effluents. This and other objects of the invention will become clear from a detailed description of the drawing and from the appended claims.

BRIEF DESCRIPTION OF THE DRAWING

FIG. 1 is a flow chart showing exemplary apparatus utilized in the practice of the method according to the present invention.

DETAILED DESCRIPTION OF THE DRAWING

FIG. 1 schematically illustrates a pulp mill 10, preferably a zero discharge mill such as shown in the parent application, which includes a chemical recovery loop including a recovery boiler 11, and also includes a bleach plant 12. Chips or other cellulosic fibrous material in comminuted form is introduced at 13 to the mill 10, while pulp produced exits at 14.

Liquid effluents are continuously produced by the bleach plant 12, and pass in line 16 to a concentration apparatus 17. The concentration apparatus 17 preferably comprises evaporators, such as the metal/plastic laminate evaporators described in the parent application, with the concentrated effluents passing to the incineration stage 18. The gaseous components that are evaporated in apparatus 17 pass—as indicated by line 19 in FIG. 1 —back to the pulp mill 10, including the bleach plant 12 thereof.

The incineration in stage 18 produces off gases which are properly treated, and ash. In the preferred embodiment according to the invention at least a part of the ash continuously passes in line 21 directly (that is not through a leach plant, crystal washing, or the like) to a chlorine dioxide production plant 22. Also, at least a portion of the ash continuously passes in line 23 to ash storage facility 24, and from the ash storage facility 24 in line 25 to chlorate manufacturing stage 26.

In the stage 26 the ash is chemically reacted to produce chlorate. This is preferably accomplished by purifying the sodium chloride in the ash and then reacting it according to the following reaction: $NaCl + O_2 + energy \rightarrow NaClO_3$. The sulfates, $Na_2SO_4$, removed from the ash can be used to produce acid or acid and caustic (see line 29), which is used elsewhere in the mill 10. Heavy metal hydroxides (MeOHS) are also generated and sent to disposal (see line 30). The chlorate produced in stage 26 continuously passes in line 28 to the chlorine dioxide plant 22, where it is used to make chlorine dioxide. Effluents are also minimized from the pulp mill 10, at least in part by feeding salts from the chlorate manufacture stage 26—as indicated by line 32—back to mill 10.

The chlorine dioxide produced in plant 22 is continuously fed via line 34 to the bleach plant 12, where it is used to bleach pulp. The system illustrated in FIG. 1 preferably can produce all of the chlorine dioxide needs of the bleach plant 12 on site, without any purchase of additional chlorine dioxide being necessary.

While it is desirable to produce all the $ClO_2$ on site, instead the ash storage 24 and chlorate manufacturing facility 26 may be off site. That is, the ash may be transported (e.g. trucked) from the mill 10 to the plant 26, and the chlorate, salts, acid and caustic transported back.

The chlorine dioxide production plant 22 also produces salt 35, which can be used to continuously produce caustic (line 36) and acid (line 37) which are ultimately used elsewhere in the pulp mill 10, e.g. to treat pulp or make pulp treating fluids. The heavy metal hydroxides produced in line 38 are typically disposed of, although subsequently developed technology may allow for the utilization thereof.

It will thus be seen that according to the present invention a simple yet effective method of producing chlorine dioxide (typically all the chlorine dioxide needs) of a cellulose pulp mill having a bleach plant, on site, is provided. While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent methods and procedures.

What is claimed is:

1. A method of producing chlorine dioxide for a cellulose pulp mill having a bleach plant including at least one chlorine containing chemical treatment stage, and a pulping system including a digester, a black liquor evaporator, and a recovery boiler, comprising the steps of automatically, continuously and sequentially:
   (a) concentrating liquid effluents from the bleach plant to a concentration level high enough for incineration;
   (b) incinerating the concentrated bleach plant effluents independent of the black liquor evaporator and recovery boiler to produce an ash;
   (c) chemically reacting at least a part of the ash from step (b) to produce chlorate; and
   (d) using the chlorate produced in step (c) in the manufacture of chlorine dioxide, which chlorine dioxide is used in the bleach plant to bleach pulp.

2. A method as recited in claim 1 wherein step (c) is practiced by purifying the ash to produce sodium chloride, and reacting sodium chloride from the ash with oxygen and external energy to produce sodium chlorate.

3. A method as recited in claim 2 wherein step (c) also produces sulfates and heavy metal hydroxides.

4. A method as recited in claim 3 wherein the sulfates produced in step (c) are used to produce acid, and comprising the further step of using the acid elsewhere in the pulp mill.

5. A method as recited in claim 4 wherein the sulfates produced in step (c) are further used to produce caustic, and comprising the further step of using the caustic elsewhere in the pulp mill.

6. A method as recited in claim 1 comprising the further step (e) of using a part of the ash from step (b) directly in chlorine dioxide manufacture.

7. A method as recited in claim 6 wherein steps (a)–(e) are practiced so as to produce all the chlorine dioxide needs of the bleach plant directly on site at the pulp mill.

8. A method as recite in claim 6 wherein steps (d) and (e) are practiced so as to produce caustic, acid, and heavy metal hydroxides, and comprising the further steps of using the acid and caustic elsewhere in the pulp mill.

9. A method as recited in claim 1 wherein steps (a)–(d) are practiced so as to produce all the chlorine dioxide needs of the bleach plant directly on site at the pulp mill.

10. A method as recited in claim 1 wherein step (d) is practiced so as to produce caustic, acid, and heavy metal hydroxides, and comprising the further steps of using the acid and caustic elsewhere in the pulp mill.

11. A method as recited in claim 10 wherein step (c) is practiced by purifying the ash to produce sodium chloride, and reacting sodium chloride from the ash with oxygen and external energy to produce sodium chlorate.

12. A method as recited in claim 11 wherein step (c) also produces sulfates and heavy metal hydroxides.

13. A method as recited in claim 12 comprising the further step of disposing of the heavy metal hydroxides.

14. A method as recited in claim 1 wherein step (a) is practiced by evaporation <,> during which gases are produced; and wherein the gases produced during evaporation are returned to the pulp mill and the bleach plant.

15. A method of minimizing effluents from a cellulose pulp mill having a digester, black liquor evaporator, bleach plant, and a recovery boiler and chemical recovery loop, comprising the steps of continuously:
   (a) concentrating liquid effluents from the bleach plant to a concentration level high enough for incineration;
   (b) incinerating the concentrated bleach plant effluents independent of the black liquor evaporator and recovery boiler to produce an ash containing sodium carbonate, sodium sulfate, and sodium chloride;
   (c) chemically reacting at least a part of the ash to produce chlorate and sodium salts;
   (d) feeding at least a substantial portion of the sodium salts to the chemical recovery loop of the recovery boiler; and
   (e) using the chlorate produced in step (c) in the manufacture of chlorine dioxide, which is used in the bleach plant.

16. A method as recited in claim 15 wherein step (c) is practiced by purifying the ash to produce sodium chloride, and reacting sodium chloride from the ash with oxygen and external energy to produce sodium chlorate.

17. A method as recited in claim 16 wherein step (c) also produces sulfate and metal hydroxides, and wherein the sulfates produced in step (c) are used to produce acid used elsewhere in the pulp mill.

18. A method as recited in claim 17 wherein the sulfates produced in step (c) are further used to produce caustic, which is used elsewhere in the pulp mill.

19. A method as recited in claim 15 wherein step (a) is practiced by evaporation <,> during which gases are produced; and wherein the gases produced during evaporation are returned to the pulp mill and the bleach plant.

20. A method of producing chlorine dioxide for a cellulose pulp mill having a bleach plant including at least one chlorine containing chemical treatment stage, black liquor evaporator, and a recovery boiler, comprising the steps of automatically, continuously and sequentially:

(a) concentrating liquid effluents from the bleach plant to a concentration level high enough for incineration;

(b) incinerating the concentrated bleach plant independent of the black liquor evaporator and recovery boiler to produce an ash; and (c) using at least a part of the ash directly in the manufacture of chlorine dioxide, which chlorine dioxide in turn is used in the bleach plant to bleach pulp.

21. A method as recited in claim 20 wherein step (c) is practiced so as to produce caustic acid, and heavy metal hydroxides; and comprising the further steps of using the acid and caustic elsewhere in the pulp mill.

22. A method as recited in claim 20 wherein step (a) is practiced by evaporation <,> during which gases are produced; and wherein the gases produced during evaporation are returned to the pulp mill and the bleach plant.

* * * * *